United States Patent

[11] 3,613,085

[72] Inventor Paul L. Winskell
North Hollywood, Calif.
[21] Appl. No. 765,070
[22] Filed Oct. 4, 1968
[45] Patented Oct. 12, 1971
[73] Assignee Lockheed Aircraft Corporation
Burbank, Calif.

[54] DIGITALLY CONTROLLED RADIO COMMUNICATION SYSTEM
14 Claims, 8 Drawing Figs.

[52] U.S. Cl. ..... 340/172.5
[51] Int. Cl. ..... G06f 1/00, G11b 31/00
[50] Field of Search ..... 235/157, 150.22, 150.23, 150.24; 340/172.5, 147, 150, 151, 152, 171

[56] References Cited

UNITED STATES PATENTS 3,058,104 10/1962 Garfinkel et al. ..... 340/152 X
3,387,268 6/1968 Epstein ..... 340/172.5 X

*Primary Examiner*—Gareth D. Shaw
*Assistant Examiner*—Melvin B. Chapnick
*Attorneys*—George C. Sullivan and Ralph M. Flygare ABSTRACT: A communication and radio-navigation information storage, retrieval, control and verification system for storing in coded form all assigned communication and navigation frequencies and the identifying Morse code for various information source locations. It further includes a keyboard for selecting a source location and a particular communication or navigation function. An encoder coupled to he keyboard selectively locates and removes the coded information from storage which is representative of the source location and the function. The system responds to the selected coded information to tune a radio receiver to the frequency corresponding to the selected coded information. The coded source-location identifying signal, received by the radio receiver, is supplied to a code recognition circuit. A code comparator compares the output of the code recognition circuit and the portion of the manually selected coded information (indicative of the desired source location) to produce a visual or other output signal to the operator when parity exists.

INVENTOR.
PAUL L. WINSKELL
BY George C. Sullivan
Ralph M. Flygare
Agents

INVENTOR.
PAUL L. WINSKELL
BY George C. Sullivan
Ralph M. Flygare
Agents

INVENTOR.
PAUL L. WINSKELL
BY George C. Sullivan
Ralph M. Flygare
Agents

INVENTOR.
PAUL L. WINSKELL
BY George Sullivan
Ralph M. Flygare
Agents

INVENTOR.
PAUL L. WINSKELL
BY George C. Sullivan
Ralph M. Flygare
Agents

INVENTOR.
PAUL L. WINSKELL
BY George C. Sullivan
Ralph M. Flygare
Agents

DIGITALLY CONTROLLED RADIO COMMUNICATION SYSTEM

BACKGROUND OF THE INVENTION

Modern air travel involves more decisions and responsibility than a pilot can handle by himself. While he conducts the flight he coordinates his flight progress by radio with a vast team of experts who are also responsible for decisions affecting his flight. Navigation and communications are closely related components of cross-country instrument flight in controlled air space. As aircraft speeds are increased, the time available for accomplishment of required pilot actions is accordingly reduced. Coupled with the increasing speed of modern aircraft is the increased nonstop range of operation. At present the Federal Aviation Agency (FAA) frequency assignments include approximately 4,400 very high-frequency (VHF) communication channels, 900 ultra high-frequency (UHF) communication channels, 1,500 low-frequency (LF) channels, and 2,600 navigation channels for very high-frequency omnirange (VOR), tactical air navigation (TACAN) and instrument landing systems (ILS). These frequency assignments are further divided among 2,200 FAA facilities and services.

Government-assigned communication and radio navigation aid frequencies are published in a variety of flight information publications such as en route supplements, approach charts, or the Airmans Information Manual; or the frequency information can be found on grid maps or radio maps. In flight, a pilot must search through this information for the facility to be contacted, and further for the frequency for the specific function he wishes to accomplish. As an additional complication the individual facility to be contacted may have a large number of frequencies assigned as in the specific case of Los Angeles International Airport which has 35 individual frequencies assigned for navigation and communication purposes. This search is sometimes aggravated by aircraft motions and poor lighting conditions. To compound the problem the aircraft communications work load reaches a peak in a terminal operational area at a time when the pilot is busiest with other aircraft control operations.

Once the information relating to the facility and the frequency for the specific function has been discovered, the pilot must then obtain the desired frequency by the rotation of frequency selector knobs. Selection of a desired frequency may require the rotation of from two to six selector knobs. The radio navigation aid facilities have identifying Morse code transmissions. The pilot must listen and interpret this type of transmission, or to a voice identification in some cases, to confirm the source identity. This procedure is time consuming, can be distracting, and the cases of incorrect identification are numerous.

The information storage, retrieval, verification, and control system of the present invention automates a large amount of the procedures, outlined above, which have heretofore required the direct attention of the pilot for their accomplishment. The man/machine interface provided by the invention not only reduces the pilot's workload but may also provide additional benefits not presently available. For example, in addition to station frequency information, other facility, service, and weather information may similarly be handled by the system of the invention.

It is accordingly an object of this invention to provide a new and improved information storage, retrieval control and verification system for minimizing the previously mentioned shortcomings of prior systems.

It is another object of this invention to provide a new and improved communication and navigation information storage, retrieval and control system.

It is still another object of this invention to provide a new and improved communication and navigation information storage and retrieval system having means for verifying the source location identity.

It is a further object of this invention to provide a new and improved communication and navigation information storage, retrieval, control and verification system capable of rapid automatic operation.

It is yet another object of this invention to provide a new and improved communication and navigation information storage and retrieval system having stored coded frequency information for pertinent source locations in addition to the source location's Morse code identification.

It is a still further object of this invention to provide a new and improved communication and navigation information storage and retrieval system wherein the radio receiving means are automatically tuned by the selected coded information and the Morse code identification received by the radio receiving means is encoded to be compared with the selected coded Morse code identification of the source location to verify the selected source location.

It is another object of the invention to provide a novel and improved data processing system which overcomes the shortcomings of previous means and methods heretofore intended to accomplish generally similar purposes.

Other objects of the invention will in part be obvious and will in part appear hereinafter.

SUMMARY OF THE INVENTION

According to the present invention, the above and other objects and advantages are attained by providing means, particularly upon an aircraft, for storing in coded form the identifying coded signal for a plurality of information source locations, the categories or functions associated with each of said source locations, and the information data assigned to each of said categories or functions. A manually operable means such as a keyboard, usually operable by the aircraft pilot, is provided for selecting a source location and a particular category or function. An encoding means is provided, in the apparatus, which is responsive to said manually operable means for selectively locating and removing the coded information from said storage means representative of said source location and said category or function. A control means responsive to said selected coded information is adapted to tune selected information receiving means to receive information data indicative of said selected coded information. Code recognition means within the apparatus is responsive to the coded source location identifying signal received by said information receiving means. A code comparator means is connected to be responsive to signals from said code recognition means, and to the portion of said selected coded information indicative of the desired source location, for producing an output signal when parity exists. Indicator means are connected to be responsive to said output signal of said code comparator means for indicating to the pilot when said parity condition exists.

In certain modifications of the apparatus, or in certain modes of operation, data received from the source location may be stored for subsequent retrieval upon command initiated by the pilot via the keyboard.

The invention resides partly in the physical and electrical structures and interrelationships embodied in the data storage, processing, and control components of the system as herein specifically illustrated, but also embraces the concept of the system itself, considered as an integrated whole, and independently of the structural details of its separate parts.

BRIEF DESCRIPTION OF THE DRAWINGS

Further objects, features and advantages the present invention will be better understood from the following description considered in connection with the accompanying drawings in which.

DESCRIPTION OF PREFERRED EMBODIMENT

Figure 1:
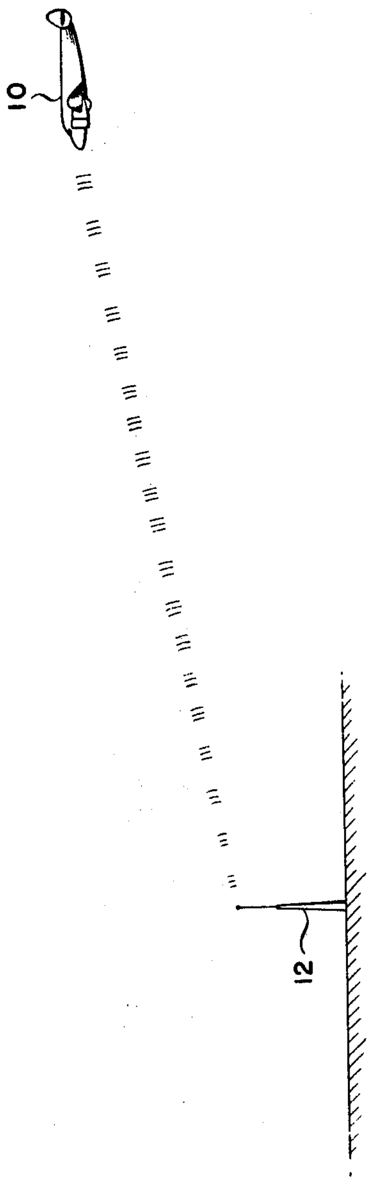
FIG. 1 shows a pictorial representation of radio communication between an aircraft and a source location.

Referring to the drawing and particularly to FIG. 1 there is depicted an aircraft 10 communicating with the radio tower 12 of a particular source location. The radio transmission shown can be for purposes of communication or navigation depending on the function desired by the pilot of the aircraft 10. Although certain features of the invention may be employed in various electronic data processing applications, it will be convenient to describe the invention in connection with the aforementioned onboard aircraft communication and navigation information system which serves to reduce the pilot's communication workload. Having gained an understanding of this form of the invention, persons skilled in the art will appreciate the manner in which the principles of the invention may be applied in other applications.

Figure 2:
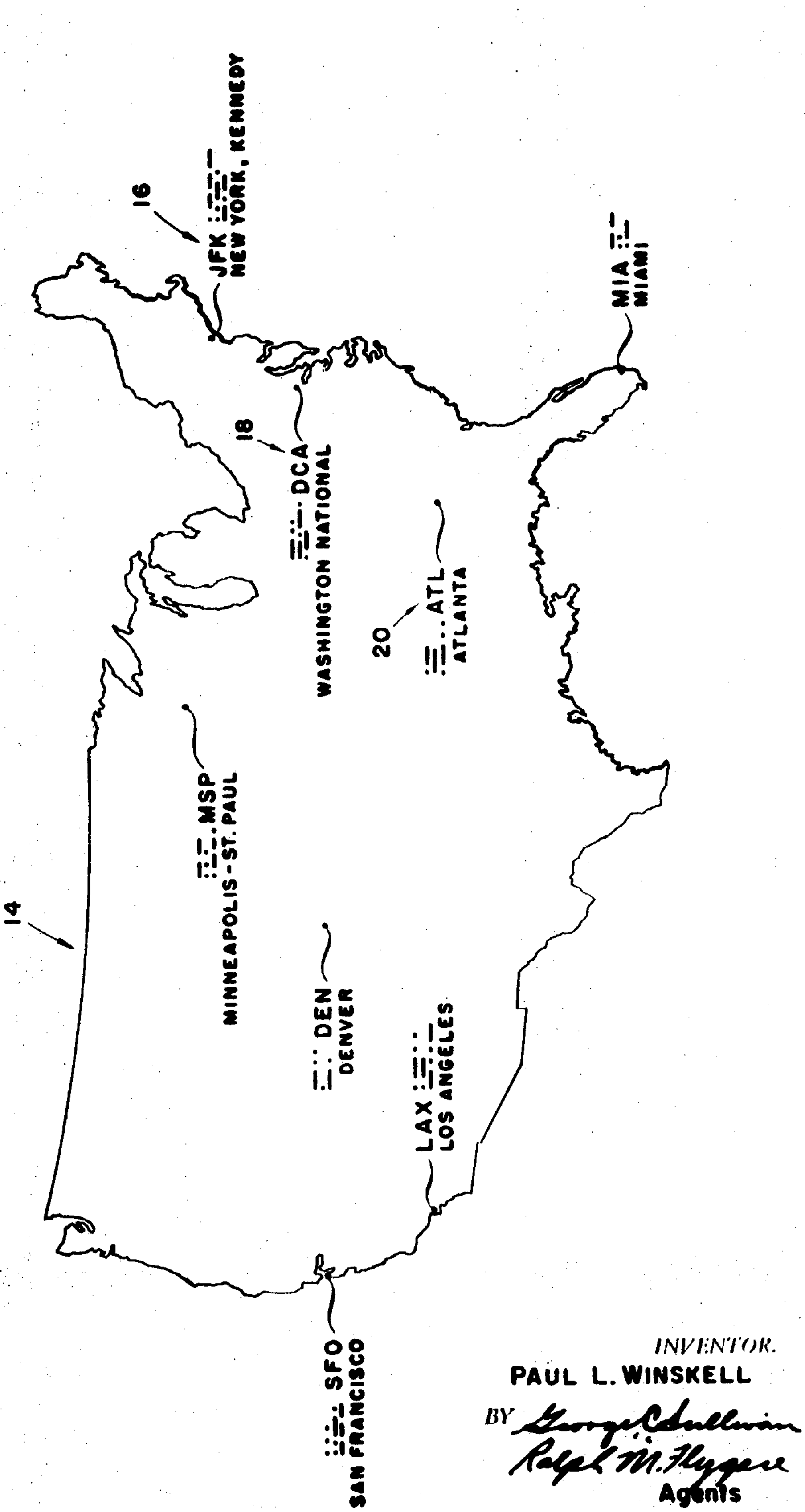
FIG. 2 shows a map of the United States, useful in the exposition of the invention, depicting the location of several major airport terminals with the three letter designation (FAA designated location identifiers) and Morse code identity for the particular source location.

Terminals or source locations are identified by two, three, or four letters in the various publications and maps available to the pilot. By way of example, the source locations may comprise VOR and ILS terminals or transmitting stations. FIG. 2 shows a map of the United States 14 with eight source locations identified by city with corresponding three-letter alphabetic and Morse code identifications, such as JFK at 16 for Kennedy International Airport at New York, DCA at 18 for Washington National Airport, and ATL at 20 for the Atlanta Airport. The Morse code identifications are automatically transmitted from corresponding radio ground stations, comprising the source locations. While there have been shown only eight source locations it should be understood that there are approximately 2,200 different FAA facilities and services having more than 7,000 individual frequency assignments for commercial and general aviation navigation and communication. Similarly there are 3,500 frequency assignments for military aircraft usage.

Figure 3:
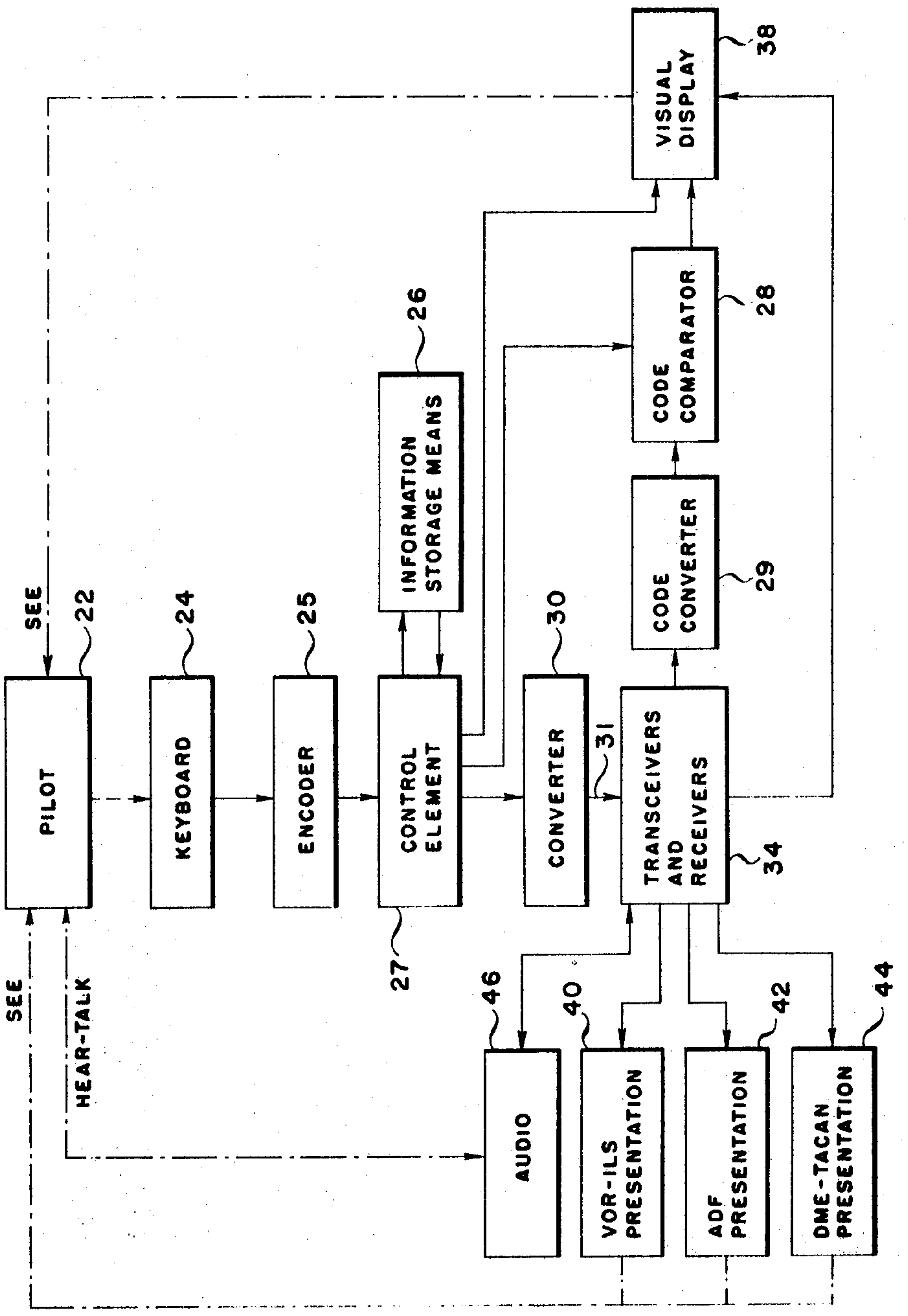
FIG. 3 is a block diagram of a communication and navigation information storage, retrieval, control, and verification system according to the invention.

An onboard communication and navigation information storage, retrieval, control and verification system according to the invention is shown in block form in FIG. 3. Inasmuch as each of the functional units represented by a block in the diagram may be any one of the numerous devices for each respective function well known in the art it is deemed unnecessary to show circuit details. Where applicable, citations will be made of descriptions of suitable system components the disclosures of which are to be incorporated into this specification by reference. The pilot 22 manually actuates a keyboard 24 to gain access to the coded information in the information storage means 26. The keyboard is coupled to encoder means 25 for conversion, typically into binary form, to actuate the control element 27 associated with the information storage means 26. Element 27 addresses the storage means 26 which contains coded frequency assignments, and Morse code representations for the source locations. The stored, addressed, frequency information is transmitted to a converter 30, and the corresponding Morse code information is transmitted to a code comparator 28.

The output of the converter 30, which appears on line 31, is used to control the tuning (viz, the operating frequency) of the transceivers and receivers 34. As will be recognized by those versed in the art, various means exist by which radio communication equipment may be selectively tuned in response to digital control signals. One example of such tuning means is disclosed in U.S. Pat. Ser. No. 2,934,745 entitled "Remote Frequency Selection System." Another well-known digitally controlled radio tuning system, and which is preferred in the present invention, is responsive to a "two-out-of-five wire" digital coding system to establish the operating frequency of the radio communication equipment. The two-out-of-five wire code method of tuning operates as follows:

The converter 30 receives the binary-coded frequency information from the storage means 26 and sends a corresponding two-out-of-five wire signal to the transceivers and receivers 34 via line 31. The two-out-of-five method of tuning radio communication equipment is defined in Aeronautical Radio, Inc. specification number 410, entitled "Mark-2 Standard Frequency Selection System" issued Oct. 1, 1961.

As mentioned previously, code conversions other than straight binary-code or two-out-of-five code may be employed, as required in particular established systems. Furthermore, if the radio communication equipment (e.g., transceivers and receivers 34) is designed to operate directly with a binary-coded-decimal (BCD) frequency control, code conversion as provided by converter 30 may be dispensed with all together. An example of these latter type of radio communication equipment is the Model 718 HF transceiver, using a 32 serial bit message, manufactured by Collins Radio Company, Cedar Rapids, Iowa. When used with such equipment the apparatus of the present invention would require only that the message storage format be compatible with that utilized by the transceiver. The transceiver 34 provides a signal, indicative of the transceiver frequency, to the visual display device 38 for the operator or pilot to see. Remote frequency readouts, suitable for use in the invention, are available from Industrial Electronic Engineers, Inc., Van Nuys, Cal., which operate directly with the transceiver. The transceivers and receivers 34 then receive the transmission from the source location to which it is actually tuned. The Morse code identifying signal from that source location is inserted into a code converter 29, coupled to the code comparator 28, for conversion of the received Morse code signal into (typically) binary form. The converted signal is then compared with the binary coded Morse code identifying signal received from the information storage means 26 to produce an output signal if parity exists. The output signal, indicating parity, is then displayed on the visual display device 38. Transceivers and receivers 34 are coupled to provide conventional visual displays such as the VOR–ILS presentation 40, the automatic direction finder presentation 42, and the DME (distance measuring equipment)–TACAN presentation 44. A conventional audio section 46 is also coupled to the transceivers and receivers 34 for communication by the pilot with the appropriate source location.

Figure 4:
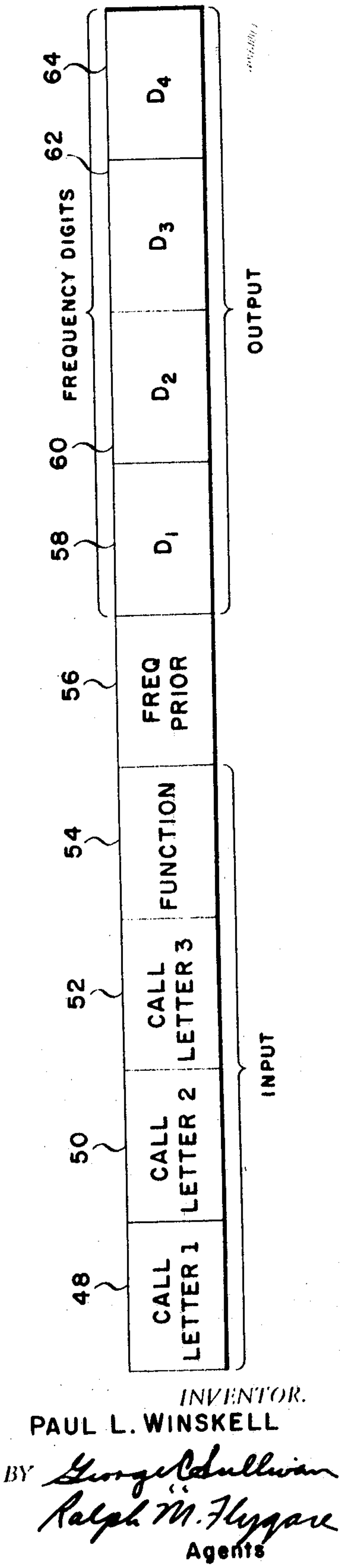
FIG. 4 shows blocks representative of information format and storage requirements for a source location, a function, and a frequency assignment for that function.

The individual frequencies assigned for each function for a particular source location are stored in the information storage means 26 by suitable storage means such as magnetic tape, disc or drum. All the frequency assignments published in the Airmans Guide can be stored in tape form or, alternatively, the amount of information stored can be limited by selecting only those source locations which are essential to a predetermined flight plan, by making such magnetic tapes readily removable. The information storage format of FIG. 4 is typical in which, reading from left to right, the first three blocks 48, 50 and 52 contain the three call letters, usually in coded form, respectively identifying the source location or air terminal facility desired. The box designated 54 contains the coded data for the specific communication or radio navigation aid function to be performed, e.g., Approach Control, Tower, ILS. The block designated 56 contains the coded data for the frequency priority. This block is used because a specific function may have several frequencies assigned for that specific function. The corresponding frequency digits are stored in coded form in blocks 58, 60, 62 and 64 which are respectively designated $D_1$, $D_2$, $D_3$, and $D_4$. The frequency digit information stored therein would be the frequency information for the specific function, and the specific frequency for the specific function with the specific frequency priority. Typically, for a frequency of 126.75 MHz, $D_1$, $D_2$, $D_3$, and $D_4$ would read 2675. The "1" would be wired in. As will hereinafter be explained, the coded information pertaining to the Morse code identity of the source location indicated by the call letters in 48, 50 and 52 may need to be stored in a particular form.

Figure 5:
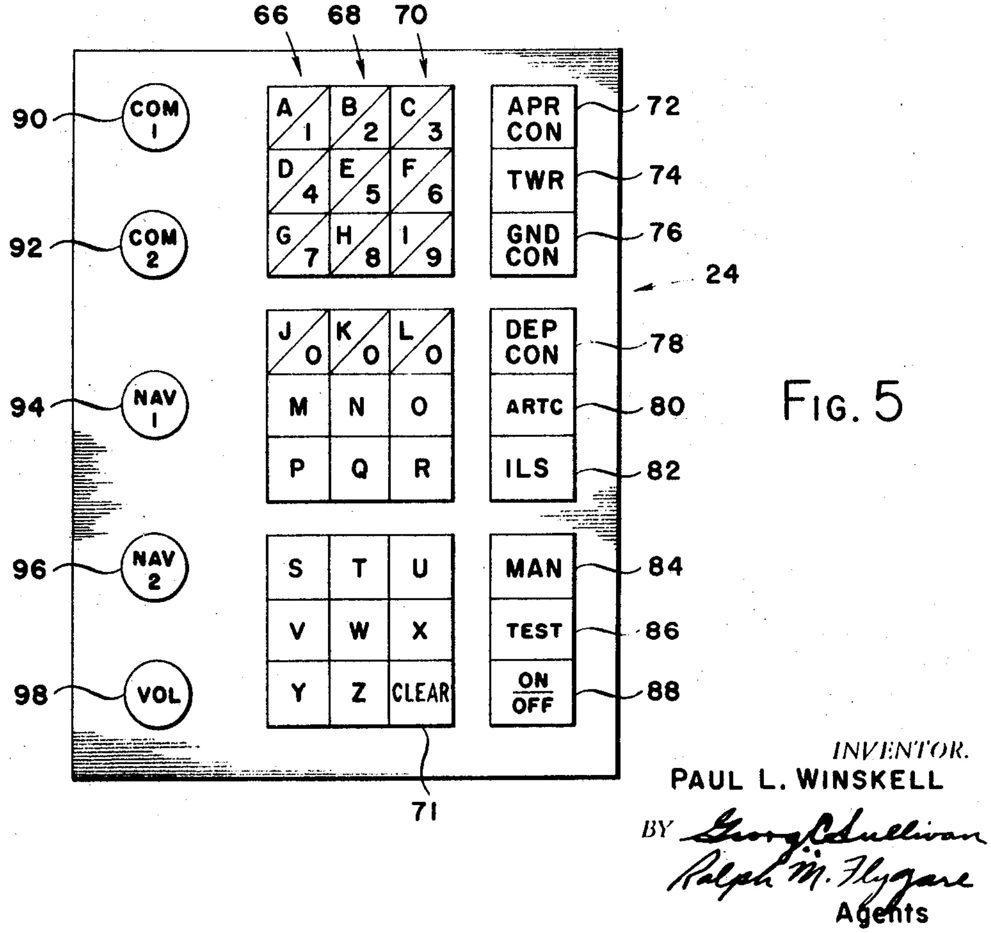
FIG. 5 is a plan view of an alphanumeric keyboard constructed in accordance with the invention.

Referring now to FIG. 5 there is shown one embodiment of the layout of the keyboard 24, illustrated in block form in FIG. 3. The particular arrangement illustrated contains three rows 66, 68 and 70, of nine buttons each, designating the entire alphabet with the 27th button (71) being a "clear" button. Additionally the first 12 buttons are diagonally divided to display the numerals "1" through "9" in conjunction with the letters "A" through "I" while the letters "J," "K" and "L" also display the numeral "0." Extending vertically on the right-hand side of the keyboard panel are the "Approach Control" button 72, the "Tower" button 74, "Ground Control" button 76, "Departure Control" button 78, "Air Route Traffic Control" button 80, the "Instrument Landing System" button 82, a "Manual" button 84, a "Test" button 86, and an "On-Off" button 88. The control buttons 72 through 82 designate the functions which are stored in block 54 of the storage format of FIG. 4. On the left side of the keyboard 24 are located in vertical form the on/off and volume control buttons for each of two communication transceivers, respectively designated 90 and 92, and the on/off and volume control buttons for each of two navigation receivers, respectively designated 94 and 96, in addition to a master volume control button 98. Each of the buttons on the keyboard 24 is preferably of the illuminated type. That is, it is preferred that these buttons be of the type which light up and remain lighted to indicate when their respective functions have been placed into operation.

Figure 6:
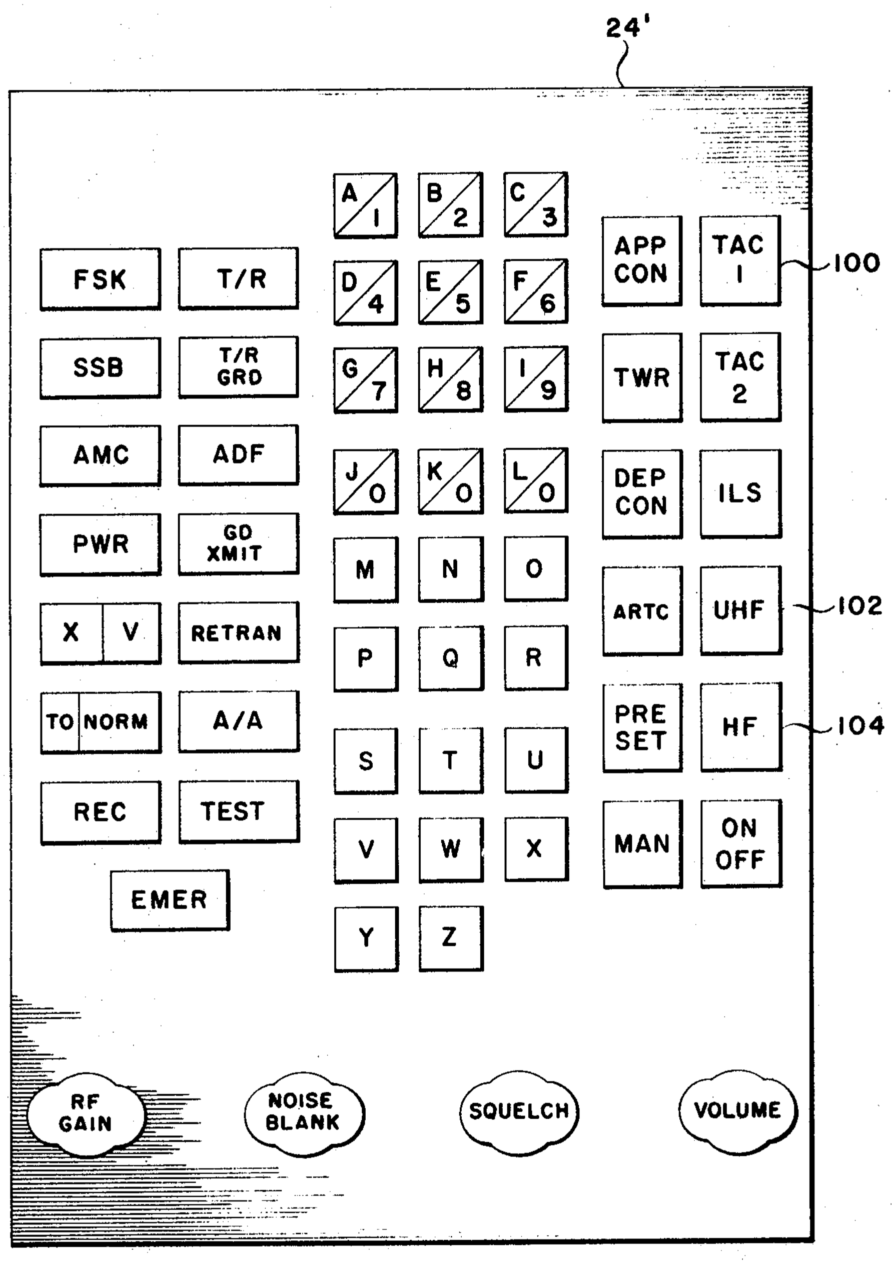
FIG. 6 is a plan view of an alternative alphanumeric keyboard according to the invention.

The keyboard 24, actuates an encoder 25 translating the alphanumeric characters into the necessary binary form for processing by the control element and the information storage unit. Electronic keyboards of this type (with the encoding means), suitable for use in implementing the invention, are manufactured by Transistor Electronics Corporation of Minneapolis, Minn. A modified keyboard layout, designed especially for military aircraft is shown in FIG. 6. This keyboard is designated 24', with additional function buttons such as "-TACAN" buttons 100, "UHF" button 102 and "HF" button 104.

Access to the information storage means 26 of FIG. 3 is accomplished by a control element 27. The control element 27 is the section, of conventional digital computers, which sequences the operation of the computer, controlling the action of all other components of the computer system. The control circuitry interprets the instructions received from the keyboard-encoder 25 and directs the rest of the required information retrieval, control and verification operations. Such control elements are well known in the art. A control element and information storage unit that can be utilized in this invention is the Hughes Aircraft Company Model HCM-205 aerospace computer. The frequency information may optionally be stored in any of the storage forms available today, i.e., punched tape, magnetic tape, magnetic drum, and magnetic core. In a particular apparatus, the frequency information is stored on a continuous loop of magnetic tape in which less than 10 feet of tape can be used to store in binary form all the frequency assignments for all the presently existing FAA facilities and services. A tape recorder of this type, suitable for use in this invention, is manufactured by the Ralph M. Parsons Electronics Company of Pasadena Cal., and is designated Model CLR-75 continuous loop tape recorder. It is capable of containing up to 75 feet of tape in an insertable magazine.

The tuning of the transceivers and receivers 34 is accomplished by employing a transceiver which is automatically tunable by the "two-out-of-five wire" method as hereinabove mentioned, or which is tunable by the binary coded decimal (BCD) method of frequency control, also hereinabove mentioned. Communication and radio navigation equipment is currently being manufactured to the ARINC specification No. 410 (two-out-of-five wire) for airline and business aviation usage, with one specific example being the Bendix RTA-42 VHF transceiver.

As previously mentioned, the code comparator 28 receives one input from code converter 29 which converts the Morse code identifying signal received from the source location by transceivers and receivers 34 into suitable binary form. Such code recognition means are well known in the art for discriminating between the dots and dashes and thereafter converting them into binary form suitable for direct input to the computer. The basic time measurement for such a system is the "dot" signal with the "dash" being generally three times the length of the "dot." A code recognition system suitable for use in the present invention is shown and described in U.S. Pat. No. 2,840,637 to McNaney et al. issued on June 24, 1958 for a "System for Converting Telegraphic Code Into Characters." This system employs six binary bits for coding the alphabet, 10 decimal digits, and several punctuation marks, with each dot being represented by a "1" and each dash being represented by an " ." However, only four bits are required if it is desired to represent only the alphabetical characters.

Figure 7:
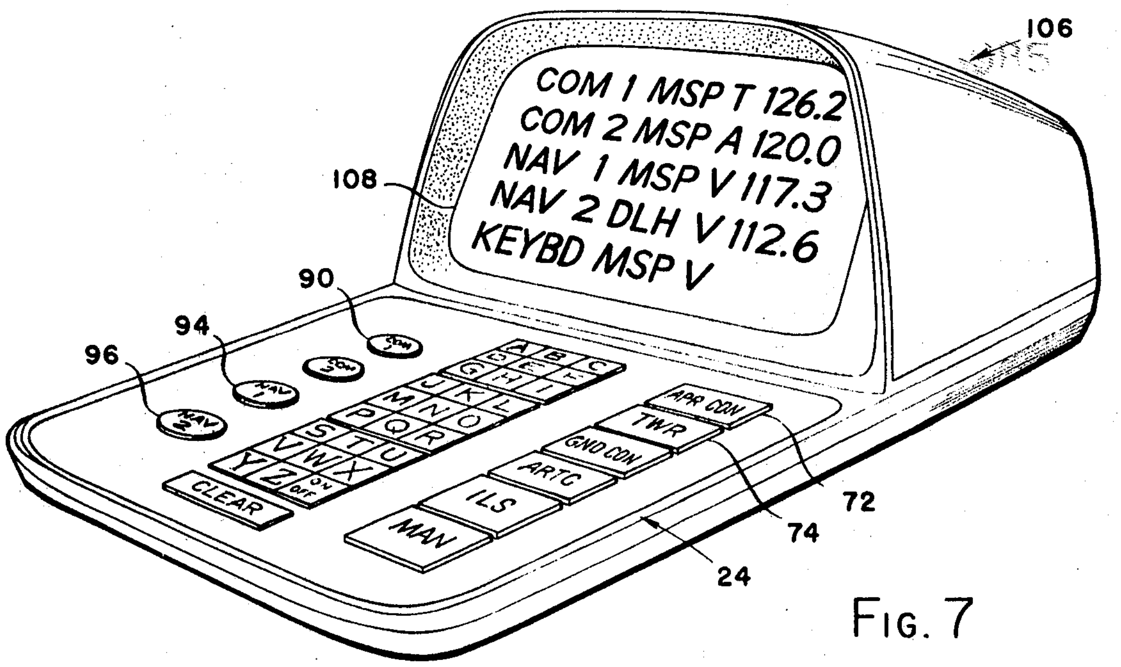
FIG. 7 is a perspective view of a display console according to the invention utilizing the keyboard of FIG. 5.

The mode of operation of the communication and navigation information storage, retrieval, control and verification system shown in FIG. 3 will be discussed in connection with FIG. 7 which shows a display console 106 having a viewing screen 108 and a keyboard 24. The pilot first depresses the keys identified with the characters MSP (designating the Minneapolis-St. Paul terminal area). He then sequentially depresses the "Tower" button 74, then the "Com 1" button 90 to obtain automatic tuning of the communication transceiver and a visual display of the frequency 126.2 MHz. The frequency obtained will automatically be the first of the frequencies assigned to the Tower. If an alternate tower control frequency is desired (upon tower request, for example), the pilot depresses the "Tower" button 74 a second time.

For the "VOR" selection, the call letters need not be depressed again. The pilot merely depresses the "NAV 1" button 94 to obtain automatic tuning of the VOR receiver and a readout of the Minneapolis-St. Paul "VOR" frequency of 177.3. It should be emphasized at this point that the displayed information is in the same format as the storage format of FIG. 4 with the exception of the frequency priority block 56 designated therein. The designation "V" on the display screen 108 is for the VOR function, the designation "Tower" is for the tower function and the designation "A" is for the approach control function. The designation "KEYBD MSP V" is an indication of keyboard status, showing the most recent pilot action at the keyboard. If the Morse code identification signal actually received in transceivers and receivers 34 is identical to the desired Morse code identification signal stored in the information storage means 26, an output from the code comparator will allow the presentation of stored information on the viewing screen 108. By this means the pilot has a visual display of the parity condition. As an alternative, the output of the code comparator 28 can be utilized to actuate an audible tone device or a remote indicating device such as a verification light on a panel or a similar device; in such case, the stored information would be transmitted directly from the control element 27 to the viewing screen 108 independent of the confirmation signal.

Figure 8:
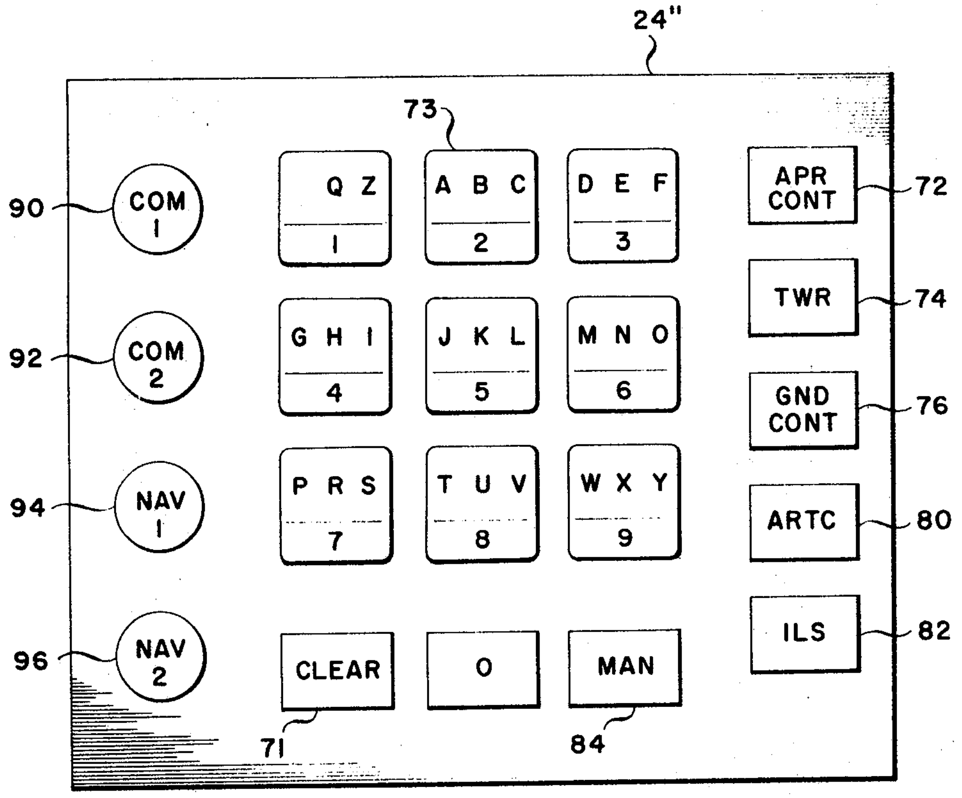
FIG. 8 is a plan view of an additional alternate keyboard according to the invention.

An alternative, simplified keyboard arrangement is shown in FIG. 8 in which the keyboard 24 shows a 10-key alphanumeric keyboard, the keyboard placement of which is of the type conventionally employed in pushbutton telephones. In this embodiment, the keys contain the numerals "1" through "0" respectively. Also, those keys containing the numerals "2" through "9" each contain three letter characters, and the key containing the numeral "1" contains two letters. The keys operate in a fashion similar to a one-hand, three-position, keyboard of the type shown and described in U.S. Pat. No.

3,022,878 issued to Seibel et al. on Feb. 27, 1962 for a "Communication Device." For example, the letters A, B, and C are made available by successive push actions of the same button (e.g., button 73). The portion of the button carrying the letter A is lighted to show that the button has been depressed once. Depressing the button twice in succession will yield B and will light the letter B. Depressing the CLEAR button 71 will extinguish all lighted buttons and restore the keyboard to a reset or cleared condition. If the MANUAL button 84 is depressed, then the keyboard will operate in the numeric mode (as described previously) whereupon pressing button 73 will yield the number 2. All other operations of the keyboard shown in FIG. 8 are the same as those described previously in connection with FIGS. 5–7.

In any of the keyboard arrangements shown in FIGS. 5, 6, and 8, the manual tuning of the transceivers and receivers 34 can be accomplished by depressing the "Manual" button 84, then depressing in sequence the digits representative of the frequency desired, and depressing the proper button designating the receiver or transceiver to be tuned.

From the foregoing it is seen that the invention is compatible with existing radio equipment, information storage devices, and aircraft control facilities and procedures. The pilot communications procedures are simplified, and the workload is reduced. The aural identification of radio-transmission sources can be eliminated.

While there have been shown and described and pointed out the fundamental novel features of the invention as applied to preferred embodiments, it is to be understood that various omissions and substitutions and changes in the form and details of the systems illustrated and in their operation may be made by those skilled in the art, without departing from the spirit of the invention. For example, weather reports may be received in flight, automatically stored and retrieved as desired by the pilot for whatever weather area is of interest. Also, specific data about terminal runways and services available may be stored and selectively retrieved. Therefore, it is intended that the invention be limited only as indicated by the scope of the following claims.

What is claimed is:

1. An information storage, retrieval, control and verification system comprising:

means for storing a plurality of operating codes together with corresponding ones of a plurality of address codes, said address codes each identifying respective ones of a plurality of remotely located information sources, and the information from each of said information sources includes a corresponding source identity code;

means for selecting a given one of said address codes;

means responsive to a selected address code for retrieving the operating code corresponding thereto from said storing means;

means for receiving said identity codes from said remotely located information sources;

code comparator means for comparing said selected address code with the identity code received from a selected one of said information sources;

means connected to said storing means and responsive to operating codes retrieved therefrom for receiving information from said selected one of said information sources and for supplying the identity code received therefrom to said code comparator means for comparison with the selected address code in said retrieving means; and indicator means connected to said code comparator means for indicating when coincidence occurs between said selected address code and said received identity code.

2. An information system as defined in claim 1 wherein each of said operating codes comprises a distinct digitally encoded radio communication operating frequency and wherein each of said address codes comprises a unique alphanumeric radio communication source identification; and including:

encoder means for converting the selected one of said address codes into a corresponding digital code prior to its being entered into said retrieving means.

3. An information system as defined in claim 1 wherein said address code selecting means includes:

a manually operated keyboard for selecting said given one of said address codes.

4. An information system as defined in claim 1 wherein said means for receiving information includes a radio receiver responsive to said information sources for supplying the information and the source identity codes received therefrom and wherein said remotely located information sources each includes a radio transmitter for transmitting said information and said source identity codes corresponding thereto.

5. An information system as defined in claim 1 wherein said indicator means includes:

an alphanumeric display for indicating said selected address code and the operating code corresponding thereto.

6. A system for storing coded information, retrieving the stored coded information in response to a command, and for verifying the retrieved coded information in response to a received signal indicative of the source of the actual information received, comprising:

a. first means for storing information, in coded form, representative of a plurality of source locations and categories of data pertinent to each of said source locations, together with an identifying signal for each of said source locations;

b. second means for selecting the coded information representative of a desired source location and at least one of said categories;

c. third means for receiving information from any of said source locations;

d. fourth means, responsive to that portion of the selected coded information indicative of said category for actuating said third means so as to receive information from the actual source location which corresponds to said desired source location;

e. fifth means for comparing the identifying signals received from said actual source location with that portion of the selected coded information indicative of said desired source location to produce an output signal; and f. sixth means responsive to said output signal for indicating when the identifying signals received from said actual source location are identical with said desired source location coded portion.

7. A system as defined in claim 6 wherein said fifth means includes means for converting the identifying signal of said actual source location to the coded form of the identifying signal of said desired source location.

8. A system as defined in claim 7 wherein said third means includes a radio receiver for receiving information via radio communication from any one of said source locations, and the identifying signal of said actual source location is Morse code.

9. A navigation and communication information storage and retrieval system comprising:

a. means for storing in coded form 1. a plurality of source locations with an identifying signal for each source location,
2. a plurality of functions for each of said locations, and
3. individual radio communication frequencies assigned to each of said functions;

b. means for selecting a desired source location and a function;

c. means responsive to said selecting means for removing from said storage means the coded information which corresponds to said desired source location and function;

d. selectively tunable radio receiving means for receiving actual source location signals;

e. means connected to said removing means and responsive to the coded form of the radio communication frequency assigned to said selected function for tuning said radio receiving means to the individual frequency assigned to said selected function;

f. means for comparing an identifying signal received by said radio receiving means from an actual source location and the coded form of the information identifying the selected source location; and g. verifying means responsive to said comparing means for indicating the results of the comparison made by said comparing means.

10. A system as defined in claim 9 wherein the identifying signal received from the actual source location is in Morse code, and said comparing means includes means for converting the Morse code identifying signal of the actual source location into the coded form of the storage means.

11. A system as defined in claim 9 wherein said selecting means includes a manually operable keyboard for selecting said desired source location and function, coupled to an encoding means for converting an input to said keyboard into the coded form of said storage means.

12. A system as defined in claim 11 wherein said verifying means includes a visual display for indicating the results of said comparison, said visual display also displaying the desired source location and function selected by said keyboard and the frequency assigned to said selected function.

13. A system as defined in claim 12 wherein said means for storing includes a magnetic recording media for storing the coded form of said source locations, said identifying signals, said functions, and said radio communication frequencies.

14. An information storage, retrieval, control and verification system comprising:

a keyboard for manually entering alphanumerically coded data into said system;

an encoder means connected to said keyboard for converting said alphanumerically coded data into a first digital code;

data transmission control means connected to said encoder means for transmitting digitally encoded data received from said encoder means and for generating control signals;

means for obtaining control signals from said control means;

digital storage means, connected to said control means, for receiving and storing digitally encoded data obtained from said control means and for reproducing digital data stored in said storage means in response to said control signals obtained from said control means;

converter means responsive to said reproduced digital data from said storage means to generate a source selection signal;

radio receiver means for receiving information from a selected one of a plurality of remotely located information sources, the selected one of said sources being determined by the selection signal generated by said converting means;

code conversion means connected to said receiver means for converting the information from the selected one of said remotely located information sources into a second digital code;

code comparator means for comparing said first digital code obtained from said encoder means, via said control means, with said second digital code obtained from said code conversion means to determine the existence of coincidence therebetween; and indicator means connected to said code comparator means and responsive thereto for indicating when coincidence occurs between said first and said second digital codes.